United States Patent Office 3,687,851
Patented Aug. 29, 1972

3,687,851
MANUFACTURE OF HIGHLY COERCIVE CHROMIUM DIOXIDE

Hans Joerg Hartmann, 12 Im Sandgarten, 6706 Wachenheim, Germany; Karl Wilhelm Leonhard, 12 Robert-Koch-Strasse, 6712 Bobenheim, Germany; Manfred Ohlinger, 69 Sternstrasse, 6700 Ludwigshafen; Germany; and Matthias Schwarzmann, 54 Carl-Bosch-Strasse, 6703 Limburgerhof, Germany
No Drawing. Filed May 6, 1971, Ser. No. 141,003
Claims priority, application Germany, May 11, 1970, P 20 22 820.0
Int. Cl. C01g *37/02*
U.S. Cl. 252—62.51 4 Claims

ABSTRACT OF THE DISCLOSURE

A process for the manufacture of highly coercive chromium dioxide modified with at least two different foreign elements, one of which is selected from the group consisting of antimony, selenium and tellurium, is disclosed. The addition of acicular iron or acicular iron oxide produces a highly coercive chromium dioxide.

The present invention relates to a process for the manufacture of highly coercive chromium dioxide modified with foreign elements.

It is well known that ferromagnetic chromium dioxide may be produced by treating chromium trioxide at elevated temperatures and pressures in the presence of water in a single stage. It is usual to add other metals or their salts or oxides to produce modified chromium dioxide pigments which differ greatly from each other and from unmodified chromium dioxide in their magnetic properties (U.S. Pat. 3,034,988, German published application DAS 1,270,538). For example, the coercive force ($H_c$) of unmodified chromium dioxide pigments is generally below 200 oersteds, and this coercive force may only be raised above this value by employing special processing conditions (U.S. Pat. 3,278,263).

It is also known to produce chromium dioxide from chromium trioxide in two stages (U.S. Pat. 3,117,093), the first stage consisting in heating chromium trioxide in oxygen or air at atmospheric pressure for a number of hours or days at a temperature of from 150° to 380° C. In this stage, the chromium trioxide is decomposed to a chromium oxide in which the average valence is greater than 4 and less than 6. This is then converted, in the second stage, to ferromagnetic chromium dioxide by heating at temperatures of from 250° C. and pressures of from 50 to 3,000 atmospheres in the presence of water or an aqueous acid.

Here again, modified chromium dioxide may be produced by adding foreign elements or their oxides or salts in the desired proportions to the chromium compound either in the first stage or in the second stage, although the first alternative produces a chromium dioxide in which the modifying element is very evenly distributed.

We have now found that chromium dioxide having a very high coercive force may be prepared by heating chromium trioxide in the presence of water and at least two different foreign elements or their compounds at temperatures of from 250° to 500° C. and pressures of from 50 to 3,000 atmospheres, provided that one of the said foreign elements is iron in the form of acicular crystals and/or acicular oxides in proportions ranging from 0.1 to 10% by weight based on the amount of chromium trioxide used.

In the process of the invention for the manufacture of chromium dioxide by hydrothermal treatment of chromium trioxide, iron is added in addition to other foreign elements. The iron may be present in the form of acicular crystals of metal or of acicular oxides or oxide hydrates, preferably as acicular $\gamma$-iron(III) oxide or acicular $\alpha$-FeOOH. Advantageously, the needles of iron, iron oxide or oxide hydrate have a length-to-thickness ratio of from 2.5:1 to 10:1. We prefer to add the iron such that the proportion of iron metal or iron contained in the oxides or oxide hydrates is from 0.3 to 5% by weight of the amount of chromium trioxide used. The acicular crystals conveniently have a particle size of from approximately 0.4 to 1$\mu$.

Other foreign elements which may be added are those elements or compounds thereof which are known to be useful for incorporation in chromium dioxide, as described for example in German Pat. 1,152,932 or German published application DOS 1, 467,328. Particularly suitable foreign elements are metals or compounds of metals in groups *5a* and *6a* of the periodic table and compounds of iron metals, such as phosphorus, arsenic, antimony, selenium, tellurium, and nickel.

However, chromium dioxides having a particularly high coercive force are obtained when the addition of the acicular iron or iron oxide is combined with the addition of one of the elements antimony, selenium and tellurium or a compound thereof, particularly an oxide thereof, such as $Sb_2O_3$, $Sb_2O_5$, $TeO_2$ and $TeO_3$, or compounds such as nitrates, which are converted to oxidic compounds under the conditions of manufacture.

The total addition of iron or iron oxides or their hydrates and the other additives should be from 0.2 to 25% by weight based on the amount of chromium trioxide used.

Chromium dioxide may be prepared from the chromium trioxide in a single stage or, if desired, in two stages in known manner.

In the single-stage process, the chromium trioxide is heated, in the presence of water and the added foreign elements, conveniently at temperatures ranging from 280° to 350° C. and at pressures of from 150 to 700 atmospheres for approximately from 1 to 10 hours depending on the temperature used.

In the two-stage process temperatures of from 300° to 360° C. are advantageously maintained in the first stage. In the second stage, convenient temperatures are from 280° to 500° C. and the pressure is from 50 to 300 atmospheres. The duration of treatment in the first stage is from about 30 to 60 minutes, and in the second stage it is from 10 minutes to 10 hours according to the reaction pressure and temperature used. In two-stage operation, the foreign elements may be added in either stage.

In order to avoid corrosion in the autoclave, it is advantageous to operate in two stages, washing the chromium oxide obtained in the first stage to free it from chromate.

Modification with an acicular iron oxide or acicular metallic iron, as proposed in the present invention, surprisingly produces a chromium dioxide having a very high coercive force. This result is unexpected, since if a chromium dioxide which has already been modified with antimony trioxide is further modified with non-acicular $\alpha$-iron (iii) oxide, there is no increase in the coercive force but rather a tendency toward reduction thereof.

The chromium dioxide produced by the process of the invention is highly suitable for data recording and for the manufacture of magnetic recording media such as audio tapes, video tapes or magnetic discs.

The magnetic powder values given in the following tables were measured in an oscillating magnetometer at a field strength of 2,000 oersteds.

EXAMPLE 1

1,000 g. of chromium trioxide are mixed with various quantities of modifying elements and water (see second and third columns of Table 1) and placed in a vessel of titanium and heated in an autoclave over a number of hours to 3000° C. and then held at that temperature for 6 hours. The autogeneous reaction pressures are given in the fourth column of the Table, a bias of 60 atmospheres being provided in Examples C to F by initially pressuring the cold vessel with oxygen. After cooling, the black reaction product is ground, washed free of chromate and dried. The magnetic properties of the resulting chromium dioxide are given in the last three columns of Table 1. The symbols $H_c$, $4\pi\sigma_S$ and $\sigma_R/\sigma_S$ represent the initial coercivity, saturation magnetization and remanence ratio respectively.

The magnetic properties of the chromium dioxide thus obtained are given in the last three columns of the table.

TABLE 2

| | Modification based on $CrO_3$, w./w. percent | | $H_c$ (oersteds) (2,000 oersteds) | $4\pi\sigma_s$ [gauss cm.$^3$ g.$^{-1}$[ | $\sigma R/\sigma_s$ |
|---|---|---|---|---|---|
| | $Sb_2O_3$ | $\alpha$-$Fe_2O_3$ | | | |
| Example | | | | | |
| A | 0.5 | 0.6 | 316 | 770 | 0.44 |
| B | 0.5 | 1.5 | 334 | 760 | 0.45 |
| C | 0.5 | 3.0 | 127 | 707 | 0.29 |
| D | 0.5 | 6.0 | 103 | 517 | 0.25 |
| | | $\gamma$-$Fe_2O_3$ | | | |
| F | 0.5 | 0.6 | 325 | 835 | 0.47 |
| G | 0.5 | 1.0 | 434 | 791 | 0.52 |
| H | 0.5 | 1.5 | 440 | 760 | 0.51 |
| I | 0.5 | 2.0 | 452 | 716 | 0.52 |
| K | 0.5 | 3.0 | 479 | 715 | 0.53 |
| L | 0.5 | | 262 | 868 | 0.42 |

TABLE 1

| | Modification based on $CrO_3$ in percent, w./w. | Percent $H_2O$ w./w. based on $CrO_3$ | Reaction pressure (atmosphere) | $H_c$ (oersteds) | Magnetic properties $4\pi\sigma s$ [gauss cm.$^3$g.$^{-1}$] | $\sigma R/\sigma s$ |
|---|---|---|---|---|---|---|
| Experiment | | | | | | |
| A | 0.5 $TeO_2$ | 20 | 120 | 470 | 880 | 0.51 |
| | 1.5 $\gamma$-$Fe_2O_3$ [1] | | | | | |
| B | 0.4 $Sb_2O_3$ | | | 380 | 855 | 0.41 |
| | 1.2 $\alpha$-FeOOH [2] | 55 | 183 | | | |
| C | 4.0 $Sb_2O_3$ | 55 | | | | |
| | 12.0 $\alpha$-FeOOH [2] | | 275 | 592 | 650 | 0.52 |
| D | 4.0 $TeO_2$ | 55 | 265 | 560 | 608 | 0.54 |
| | 12.0 $\alpha$-FeOOH [2] | | | | | |
| E | 0.5 $Sb_2O_3$ | 65 | 305 | 291 | 880 | 0.36 |
| F | 0.5 $TeO_2$ | 65 | 305 | 124 | 920 | 0.20 |
| G | 0.5 TeO | | | | | |
| | 1.5 $\alpha$-$Fe_2O_3$ | 20 | 128 | 180 | 926 | 0.25 |
| H | 0.5 $TeO_2$ | | | | | |
| | 1.0 acicular iron [3] | 50 | 250 | 420 | 783 | 0.49 |

[1] Average length-to-thickness ratio of the $\gamma$-$Fe_2O_3$ crystals used 4:1.
[2] Average length-to-thickness ratio of the $\alpha$-FeOOH crystals used 5:1.
[3] Average length-to-thickness ratio of the acicular iron used 3:1.

The above table shows that the chromium dioxide prepared according to the invention (Examples A to D and Example H) is superior to the chromium dioxide prepared in Examples E to G without the addition of acicular iron or acicular oxides of iron. It is also superior to chromium dioxide prepared with the addition of non-acicular $\alpha$-$Fe_2O_3$, as shown in Table 2.

EXAMPLE 2

1,000 g. of chromium trioxide are mixed with the particular modifying mixture (see Table 2) and placed in a pan of stainless steel, which is then placed in a muffle furnace heated at 320° C. After 20 minutes, the resulting melt of $CrO_3$ is again well stirred. The melt decomposes to $Cr_3O_8$ to $Cr_2O_5$ and thickness and eventually solidifies to a grayish black mass and the mist of $CrO_3$ vapor which occurs during the exothermic decomposition disappears. After a further 10 to 20 minutes decomposition is complete. The product is cooled and finely ground.

300 g. of the chromium oxide thus obtained are charged, together with 75 ml. of water, to a glass container which is then placed in a 1,000 ml. autoclave. A further 150 ml. of water are placed between the glass wall and the autoclave, and the autoclave is heated at 300° C. for from 6 to 8 hours, the reaction pressure being 120 atmospheres. After cooling, the resulting chromium dioxide is comminuted, washed free of chromate with water and dried.

In the above Table 2, chromium dioxides are listed in Examples F to K which are modified with $\gamma$-iron (III) oxide (length-to-thickness ratio 4:1) as proposed by the invention in addition to antimony trioxide. For purposes of comparison, Examples A to D list chromium dioxides which are additionally modified with non-acicular hexagonal $\alpha$-iron (III) oxide, whilst Example L gives a chromium dioxide modified only with antimony trioxide.

Comparison of the magnetic properties of these chromium dioxides shows that those modified with $\alpha$-iron (III) oxide have properties which are superior to those of the other chromium dioxides.

EXAMPLE 3

In this example mixtures of $CrO_3$ with tellurium dioxide and $\gamma$-iron(III) oxide or with selenium dioxide and $\gamma$-iron(III) oxide are converted to modified $Cr_2O_5$. The procedure is the same as that used in Example 2. In Table 3 below, the pigments additionally modified with $\gamma$-iron-(III) oxide are compared with those not containing $\gamma$-iron(III) oxide. The third column of the following table shows the quantities of water (in percent) which are added to the $Cr_2O_5$ formed in the first stage when the latter is treated in the second stage.

TABLE 3

| Example | Modification, percent | Percent $H_2O$ | $H_c$ (oersteds) (2,000 oersteds) | $4\pi\sigma_S$ [gauss $cm^3$. $g.^{-1}$] | $\sigma_R/\sigma_S$ |
|---|---|---|---|---|---|
| A | 0.5 w./w. $TeO_2$ | 60 | 249 | 860 | 0.41 |
| B | 0.25 w.w./ $TeO_2$, 0.5 w./w. $\gamma$-$Fe_2O_3$ | 28 | 420 | 872 | 0.49 |
| C | 0.3 w./w. $TeO_2$, 0.8 w./w. $\gamma$-$Fe_2O_3$ | 30 | 454 | 835 | 0.52 |
| D | 0.5 w./w. $TeO_2$, 1.5 w./w. $\gamma$-$Fe_2O_3$ | 58 | 591 | 810 | 0.55 |
| E | 0.5 w./w. $TeO_2$, 1.5 w./w. $\gamma$-$Fe_2O_3$ | 150 | 600 | 753 | 0.56 |
| F | 1.5 w./w. $SeO_2$ | 60 | 138 | 865 | 0.30 |
| G | 1.5 w./w. $SeO_2$. 1.0 w./w. $\gamma$-$Fe_2O_3$ | 60 | 346 | 793 | 0.46 |

This Table 3 again reveals that additional modification with acicular $\gamma$-iron(III) oxide (Examples B to E and Example G) considerably improves the magnetic properties of chromium dioxide.

The following table lists in the first column the magnetic properties of a magnetic recording medium containing, as magnetizable pigment, the pigment obtained according to Example 3A, and in the second column the properties of a magnetic recording medium containing, as magnetizable pigment a pigment obtained according to Example 3D.

TABLE 4

| | Example 3A pigment (no $\gamma$-$Fe_3O_3$) | Example 3D pigment (containing $\gamma$-$Fe_3O_3$) |
|---|---|---|
| Coercive force (oersteds) | 303 | 511 |
| Permanent magnetism (G) | 924 | 1,135 |
| $I_R/I_S$ | 0.715 | 0.826 |
| Remanence ratio parallel/remanence perpendicular to the direction of tape alignment | 2.2 | 2.5 |
| Bias noise at tape speed 4.75 cm./sec. (db.): Maximum modulation level at (db) | 0 | +10 |
| 12 kc./s. and tape speed 4.75 cm./sec | (1) | (1) |

1 As defined.

This table clearly shows the superiority of a magnetic recording medium containing, as magnetizable pigment, a chromium oxide doped with acicular $\gamma$-iron(III), as compared with a chromium dioxide not containing acicular iron(III) oxide.

We claim:

1. In a process for the preparation of highly coercive chromium dioxide by heating chromium trioxide at a temperature of from 250° to 500° C. and at pressures of from 50 to 3,000 atmospheres in the presence of water and modifying elements present in an amount of from 0.2 to 25% by weight based on the chromium trioxide used, one of the foreign elements being selected from the group consisting of antimony, selenium and tellurium, the improvement comprising using, as a further modifying element, iron in the form of acicular crystals or acicular oxides in an amount of from 0.1 to 10% by weight of iron based on the chromium trioxide used.

2. A process for the preparation of highly coercive chromium dioxide as claimed in claim 1, wherein the iron used is in the form of an acicular iron oxide selected from the group consisting of $\gamma$-$Fe_2O_3$ and $\alpha$-FeOOH.

3. Highly coercive chromium dioxide made by the process claimed in claim 1.

4. Highly coercive chromium dioxide made by the process claimed in claim 2.

References Cited

UNITED STATES PATENTS

| | | | |
|---|---|---|---|
| 3,034,988 | 5/1962 | Ingraham et al. | 252—62.51 |
| 3,117,093 | 1/1964 | Arthur et al. | 252—62.51 |
| 3,371,043 | 2/1968 | Hund et al. | 252—62.51 |
| 3,449,073 | 6/1969 | Balthis | 252—62.51 X |
| 3,547,823 | 12/1970 | Mihara et al. | 252—62.51 |
| 3,547,824 | 12/1970 | Mihara et al. | 252—62.51 |
| 3,583,917 | 6/1971 | Mihara et al. | 252—62.51 |
| 3,640,871 | 2/1972 | Kawamata et al. | 252—62.51 |

TOBIAS E. LEVOW, Primary Examiner

J. COOPER, Assistant Examiner

U.S. Cl. X.R.

23—145